United States Patent [19]

Ulug

[11] Patent Number: 4,517,670
[45] Date of Patent: May 14, 1985

[54] PREEMPTIVE BID COMMUNICATION SYSTEM

[75] Inventor: Mehmet E. Ulug, Schenectady, N.Y.

[73] Assignee: General Electric Company, Schenectady, N.Y.

[21] Appl. No.: 504,716

[22] Filed: Jun. 15, 1983

[51] Int. Cl.³ ............................................. H04J 3/02
[52] U.S. Cl. .................................. 370/85; 340/825.5
[58] Field of Search ...................... 370/85, 86, 87, 94; 340/825.5

[56] References Cited

U.S. PATENT DOCUMENTS

| | | | |
|---|---|---|---|
| 3,851,104 | 11/1974 | Willard et al. | 179/15 |
| 4,063,220 | 12/1977 | Metcalfe et al. | 340/147 |
| 4,161,786 | 7/1979 | Hopkins et al. | 370/94 |
| 4,210,780 | 7/1980 | Hopkins et al. | 370/80 |
| 4,320,502 | 3/1982 | de Veer | 370/85 |
| 4,387,425 | 6/1983 | El-Gohary | 370/85 |
| 4,412,326 | 10/1983 | Limb | 370/85 |
| 4,432,088 | 2/1984 | Frankel | 370/86 |
| 4,439,763 | 3/1984 | Limb | 370/85 |
| 4,439,856 | 3/1984 | Ulug | 370/85 |

OTHER PUBLICATIONS

Fouad A. Tobagi, "Multiaccess Protocols in Packet Communication Systems," IEEE Transactions on Communications, vol. Com-28, No. 4 Apr. 1980, pp. 468-488.

*Primary Examiner*—Douglas W. Olms
*Assistant Examiner*—Kenneth I. Rokoff
*Attorney, Agent, or Firm*—George B. Fox; James C. Davis, Jr.; Bernard J. Lacomis

[57] ABSTRACT

In a bus communication system, a unidirectional transmit bus is coupled to a unidirectional receive bus such that information packets leaving the transmit bus are placed on the receive bus. A plurality of bus interface units (BIUs) are coupled in series at spaced locations to the transmit and receive buses. The BIUs communicate with one another by transmitting information packets on the transmit bus and receiving transmitted information packets from the receive bus. A BIU transmits an information packet when both buses are silent. In the event of a collision between two information packets, downstream BIUs abort transmission and defer to the most upstream BIU having transmitted. Each BIU having had a transmission aborted attempts to gain access to the bus by placing a beep on the transmit bus which informs other BIUs that a BIU requests access to the bus. Only the most upstream BIU requesting access is permitted to transmit a packet. This process is repeated until all BIUs having had a transmission aborted have transmitted their aborted information packets.

41 Claims, 9 Drawing Figures

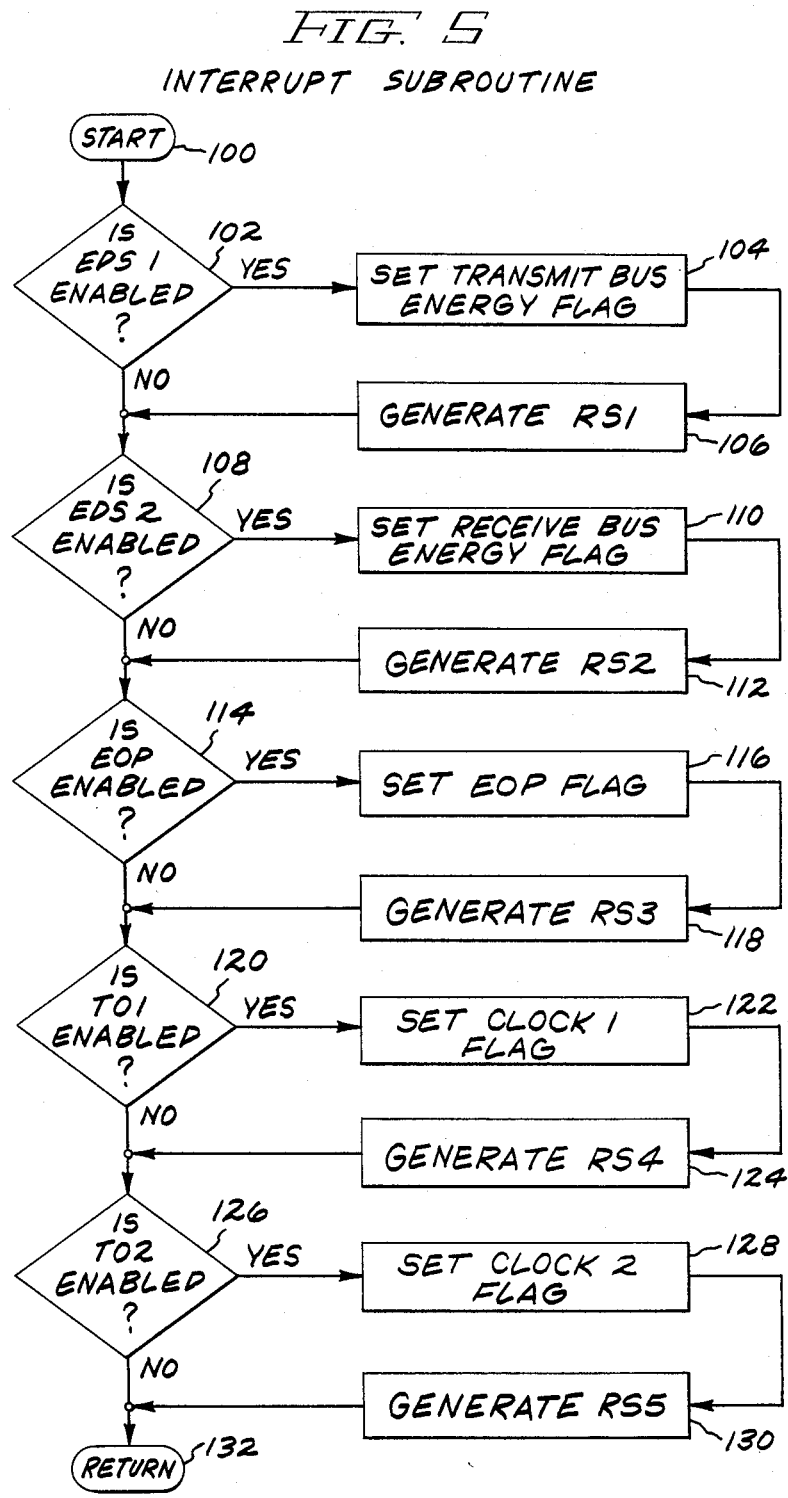

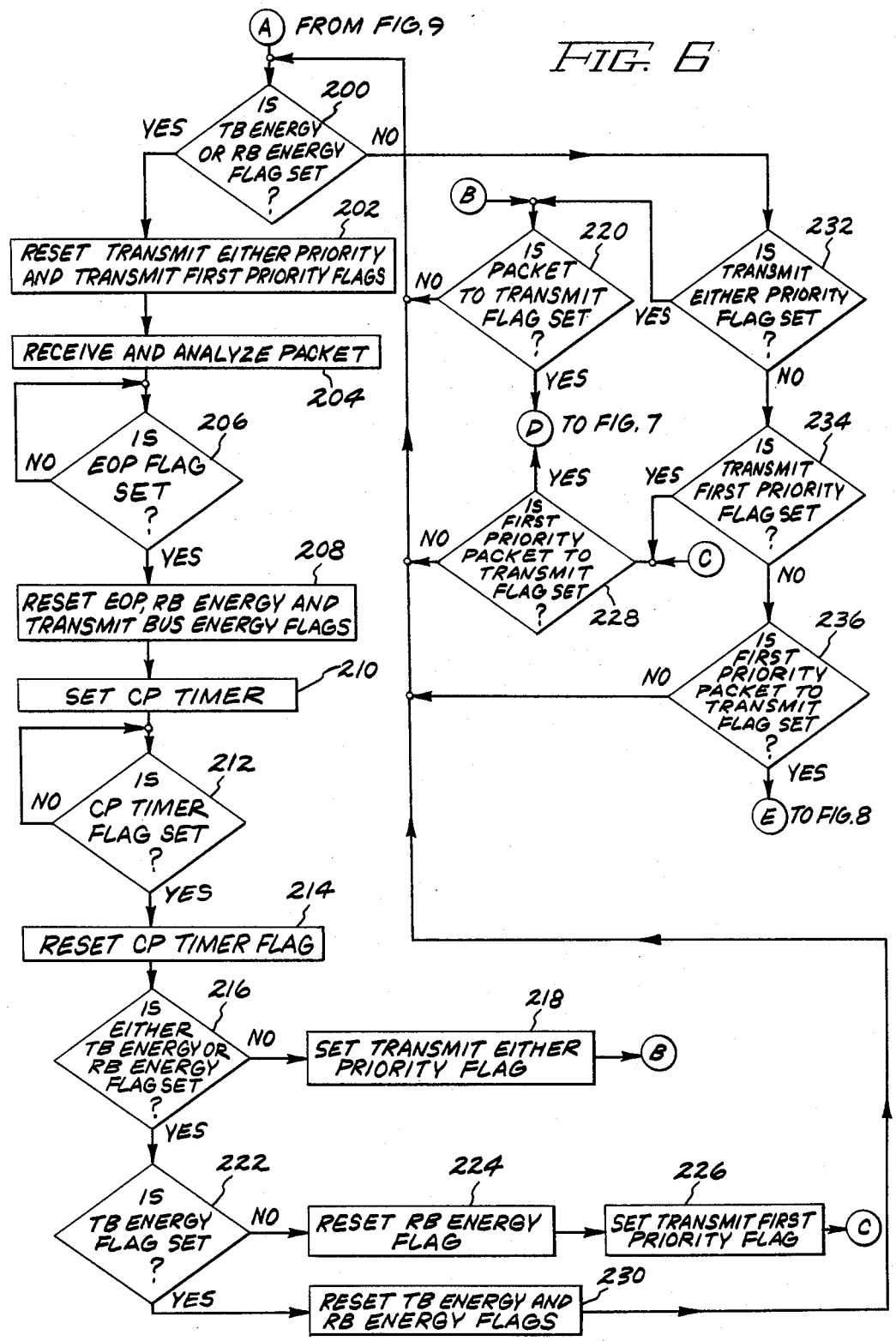

PREEMPTIVE STATE SUBROUTINE

TRANSMIT PACKET SUBROUTINE

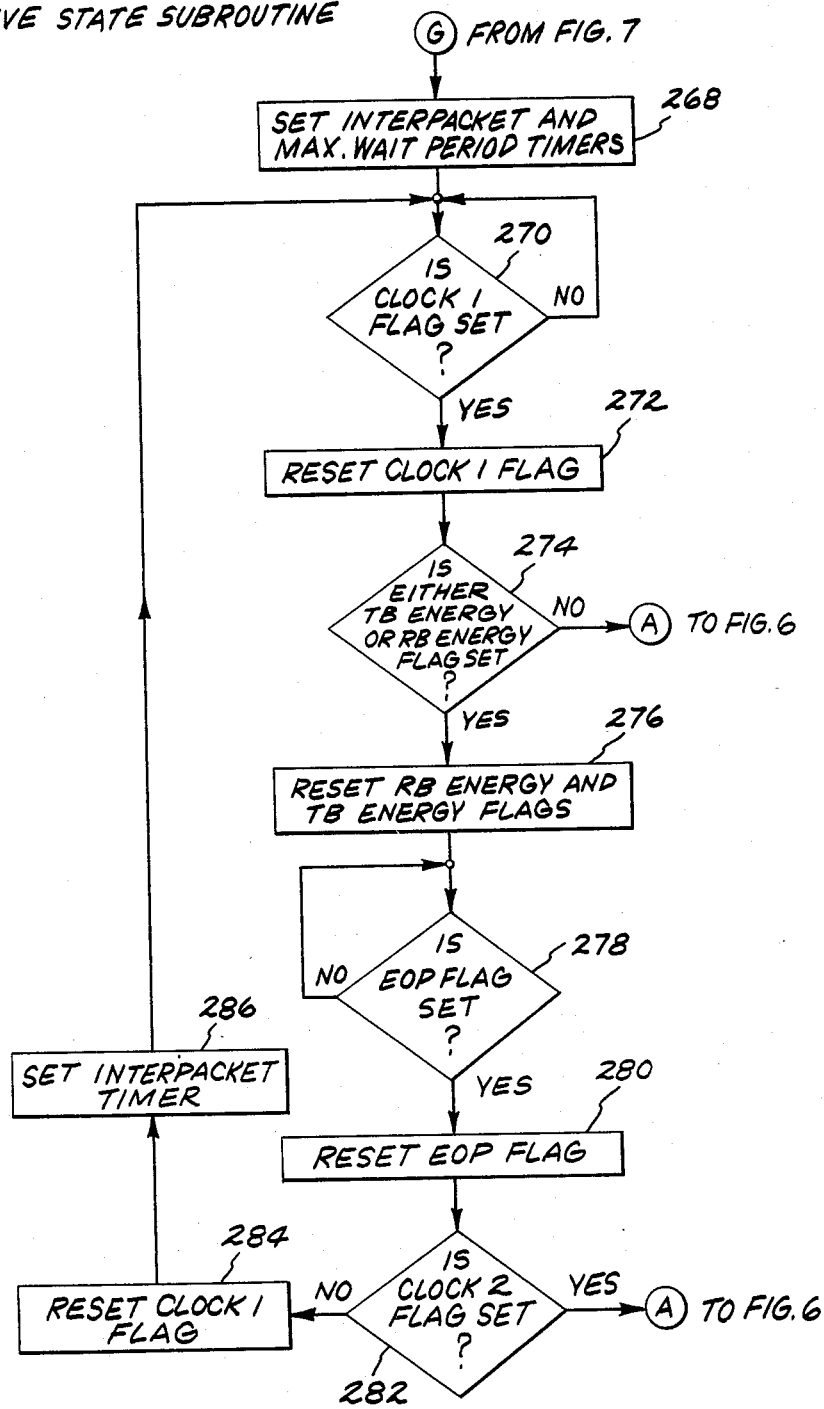

PREEMPTIVE BID COMMUNICATION SYSTEM

BACKGROUND OF THE INVENTION

The present invention is directed towards a bus accessing system and method in which a plurality of user terminals communicate with each other via a plurality of bus interface units (BIUs) which are connected to a common transmission bus. More specifically, it relates to a contention bus accessing system and method which are deterministic, i.e. have bounded (maximum) delay on successful information packet transmission.

In known bus communication systems, each of a plurality of BIUs is associated with at least one user terminal, respectively, and periodically places information from its associated user terminal on the transmission bus for transmission to the other BIUs and their associated user terminals. Each BIU formats user information into one or more information packets which generally include: a preamble; a source address (address of BIU and port associated with the user terminal which originated the information packet); a destination address (address of BIU and port associated with the user terminal for which the information is intended); information to be transmitted; and various other information, such as cyclic redundancy check (CRC) bits, etc. Once the BIU has properly formatted the information, it places the information packet on the bus for transmission to the remaining BIUs at instants determined by the particular bus accessing method being used.

One such bus accessing method is known as a time division multiplex system, wherein each user terminal is assigned a predetermined specific time slot or interval during which it can gain access to the transmission bus and place its information packets thereon. Exemplary of such systems is U.S. Pat. No. 3,851,104—Willard et al. While such systems are simple, inasmuch as they avoid the possibility of more than one information packet being placed on the bus during the same interval without the need for any complex intelligence, they are inefficient from a time utilization standpoint since the bus will be idle whenever a BIU has no information to transmit during its assigned interval.

Another bus accessing scheme is a contention system using a listen-while-talk before and during transmission protocol. In this system, the BIU continually monitors the state of the transmission bus and places information packets on the bus whenever the bus is silent, i.e. no other information packets are sensed on the bus. If, during a transmission, the BIU detects other information packets on the bus, it halts its transmission for a predetermined period of time and then attempts to regain access to the bus when the line is silent. Exemplary of such systems are U.S. Pat. Nos. 4,210,780—Hopkins et al. and 4,063,220—Metcalfe et al. One drawback of such a contention system is that it is not prioritized and high priority information may be delayed from access to the bus for substantial periods of time. Another drawback is that the bus can only be loaded to about 40 percent of its maximum information carrying capability without overloading the system.

Still another bus accessing system and method uses token passing. A token is sequentially passed from one BIU to another and only during the time interval a BIU has the token can the BIU place its information packet on the bus. Although this system avoids collisions, the token must be sequentially passed to each BIU. If a BIU has no information packet to transmit this will result in inefficient bus utilization since the bus receives a packet containing only a token and no user information packets during the interval, the BIU having no information packet to transmit controls the token. Exemplary of a token passing system is the token bus standard of the IEEE Project 802 Local Network Standards (Draft C, 1972).

Accordingly, an object of the present invention is to provide a bus accessing system and method wherein fast access to the bus is provided under light bus utilization.

Another object is to provide a bus accessing system and method wherein collisions between information packets on the bus are avoided thereby permitting heavy bus utilization.

Still another object is to eliminate the time necessary to decode a token used in a token passing scheme.

Yet another object is to provide priority for important information.

A further object is to provide equal treatment to all BIU's such that a BIU having completed transmission of an information packet permits other BIU's to attempt to complete transmission of an information packet before again attempting to transmit an information packet.

Still a further object is to provide a system wherein the delay experienced by any BIU to complete a successful transmission of an information packet is bounded, i.e. the delay is limited to a maximum.

BRIEF DESCRIPTION OF THE INVENTION

In accordance with the present invention, a plurality of BIUs are connected to a serial straight line topology bus including a unidirectional transmit and a unidirectional receive bus. Information packets are transmitted by the BIUs by supplying the packets to the transmit bus. These packets travel to the head-end of the bus where they are preferably amplified and retransmitted on the receive bus. As the packets propagate along the receive bus, they are serially received or copied by each BIU in order of its serial position along the bus. Alternatively, a single bus capable of carrying at least two channels, may be used in which case the head-end also operates as a frequency translator. Each channel operates unidirectionally at a substantially different frequency, respectively, to avoid interference and crosstalk therebetween.

Each BIU is operational in one of three modes or states: free, captive and preemptive. When the buses have been idle for a predetermined interval, all BIU's are in the free state. Whenever a BIU which has an information packet to transmit from its associate user is operating in the free state and there is no BIU operating in the preemptive state, the BIU senses both buses to determine if they are silent and if they are silent, transmits its information packets as in a contention system. Due to propagation delays, however, it is possible that a first BIU will sense that both buses are silent even though a second BIU has already begun transmitting an information packet. It is also possible that two BIU's sense the buses simultaneously and, since neither is yet transmitting, determine that the buses are silent. In either case, two (or possibly more) BIU's may attempt to transmit their information packets at the same time. This will typically result in a collision or conflict between the packets because downstream BIU's will generally still be supplying their packets to the transmit bus when the beginning of a packet from an upstream BIU reaches them.

In the event of a conflict, downstream BIUs defer to the upstream BIU and abort transmission. The information packet from the upstream BIU survives the collision with only a small portion of its preamble being damaged. As a result, communication on the bus will not be hampered by the conflict for reasons subsequently described, and each BIU is able to receive the information packet transmitted by the upstream BIU.

BIUs having had transmission preempted in favor of transmission by the upstream BIU enter a preemptive mode. During this mode, each preempted BIU tries to gain access to the bus by placing a signal or "beep" on the transmit bus during a predetermined interval or communication period, which interval directly follows the end of the last information packet sensed by each respective BIU. The beep informs all other preempted BIUs that a BIU requests access to the bus and all non-preempted BIUs that the buses are operating in a preemptive mode. Only the most upstream BIU requesting access to the bus during the preemptive mode is permitted to transmit its packet. The remaining preempted BIUs defer transmission of their information packets until the most upstream preempted BIU has transmitted its packet. When the remaining preempted BIUs receive (on the receive bus) or copy (from the receive bus) this information packet, they each again place a beep on the transmit bus. Each of the remaining preempted BIUs (excluding the BIU which has just successfully transmitted its packet) defers to the most upstream BIU requesting access to the bus. This process is repeated until all BIUs having been preempted have transmitted their packet. Such transmission is in order of BIU serial location on the bus.

After a BIU successfully completes transmission of its information packet, it operates in the captive mode, regardless of whether the successful transmission occurred during operation in the free or preemptive mode by the BIU. Operation in the captive mode prohibits the BIU from gaining access to the transmit bus. The BIU continues to operate in the captive mode until all previously preempted BIU's successfully complete transmission and for a predetermined interval or captive period, during which both buses must be silent, after the end of the successful transmission by the last of the previously preempted BIU's, in order to permit any remaining BIUs operating in the free state access to the buses. Thus the buses must be silent during the communication period (which indicates there are no BIU's operating in the preemptive mode) followed by silence during the captive period (which indicates there are no BIU's operating in the free mode, after termination of the preemptive mode, which have an information packet to transmit) before BIUs operating in the captive mode revert to operation in the free mode, as hereinbefore described. This ensures that all BIU's have an opportunity to transmit an information packet before a successful BIU transmits a second information packet.

In accordance with the foregoing bus accessing process, once a conflict has occurred, a preemption period is initiated wherein each BIU whose packet was involved in a conflict is provided with an opportunity to transmit its information packet in accordance with the serial position of the BIU along the bus. Only those BIUs which were involved in a conflict can transmit during this period. This presents some problem, when voice or other signals requiring time transparency must be transmitted. To overcome this problem, the preferred embodiment of the present invention utilizes a priority scheme wherein each packet to be transmitted is assigned either a first or second priority. Packets which need not be time transparent are assigned the second priority and transmitted in the manner described above. Those packets which require time transparency are assigned a first priority. First priority packets can be transmitted during a preemption period even if they were not previously involved in a conflict, since any BIU which has a first priority packet to transmit during a preemption period places a beep on the transmit bus to request access to the bus.

As a result of the foregoing features of the invention, the contention bus accessing scheme of the present invention makes it possible to load the bus up to at least 80% of capacity, which is a substantial improvement over prior contention systems, while still maintaining fast response under light usage (i.e. less than 40% of capacity).

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIGS. 5-9 are flow diagrams illustrating the program executed by the microprocessor of FIG. 2.

DETAILED DESCRIPTION OF THE INVENTION

Figure 1:
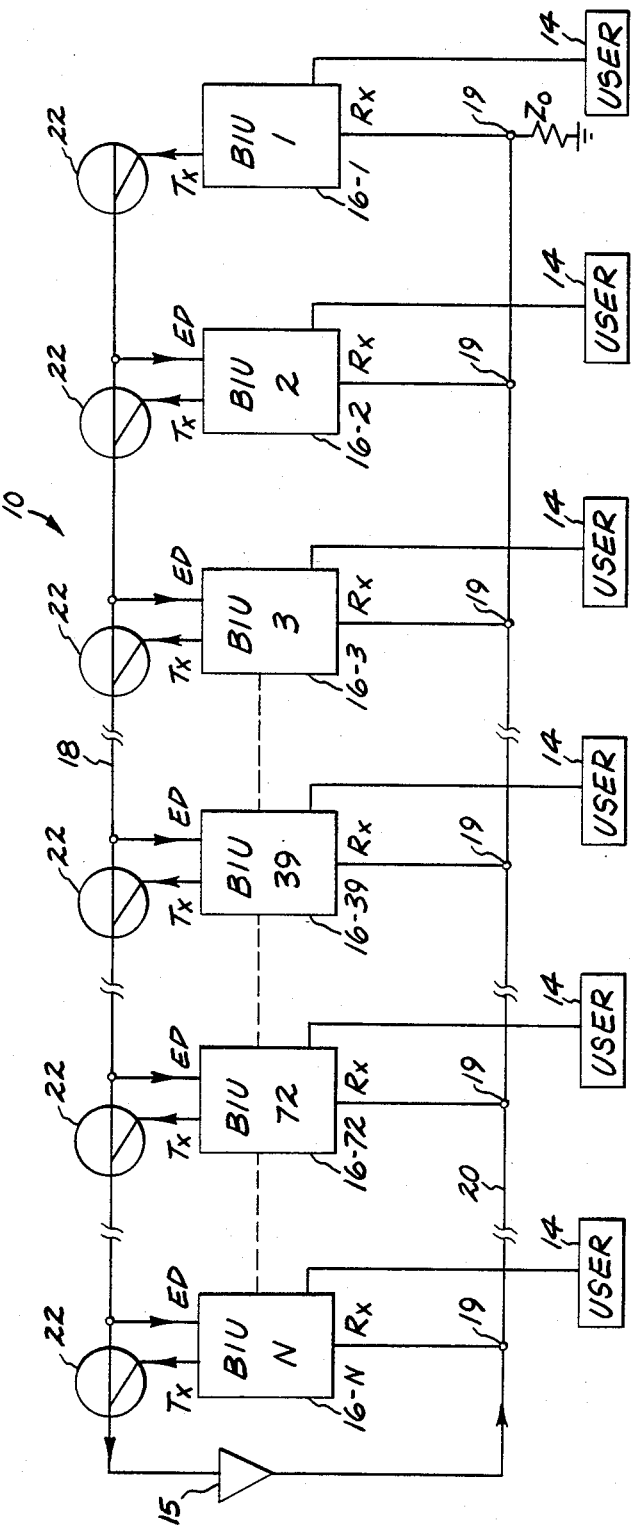
FIG. 1 is a block diagram illustrating a bus communication system in which the bus accessing scheme of the present invention may be used.

Referring now to the drawing, wherein like numerals indicate like elements, there is shown in FIG. 1 a bus communication system 10 in which the bus accessing scheme of the present invention may be used. Bus communication system 10 includes a signal transmission network including a transmit or right bus 18 and a receive or left bus 20 which is connected as a serial straight-line topology unidirectional bus to a plurality of user terminals or data terminal equipment (DTE) 14 via a plurality of bus interface units (BIUs) 16-1 through 16-N (each BIU will be referred to hereinafter generically as BIU 16). Buses 18 and 20 each comprise a transmission medium, such as fiber optic cable or coaxial cable. The upstream end of receive bus 20 may be terminated in the characteristic impedance $Z_o$ of bus 20 when bus 20 comprises coaxial cable and with a dark surface when bus 20 comprises a fiber optic cable, in order to dissipate information packets and to prevent reflections thereof along bus 20. As used herein, the terms upstream and downstream are with respect to the BIU's with BIU 16-1 being the most upstream and BIU 16-N being the most downstream. Fiber optic cable may be chosen for its high noise immunity although an increase in price is paid for passive connectors required at junctions 19 to supply a sample of signal sensed on left bus 20 to BIU 16 without distorting the signal remaining on left bus 20 directed to the remaining upstream BIUs.

Further, each BIU 16 may have a plurality of user terminals 14 coupled thereto, typically via ports (not shown) wherein each port of BIU 16 is assigned an identification address. If necessary, the bus may be folded upon itself to provide a ring, star or branching tree bus topology.

Bus communication system 10 permits any user terminal 14 to transmit data in the form of information packets to any other user terminal 14 of the system. Users 14 may be computers, terminals or other devices capable of generating and/or accepting electronic information.

While two separate buses 18 and 20 are shown, it should be recognized that a single bus could also be used in which case information is transmitted from right to left at a first frequency and from left to right at a second, substantially different frequency.

Right bus 18 serves as the transmit bus onto which each BIU 16 places its information packet to be transmitted. Information packets are received or copied by each BIU 16 via left bus 20, after being amplified by amplifier 15, and are subsequently applied to appropriate user terminals 14. Amplifier 15 may comprise a conventional amplifier or in certain cases, as where each of right and left buses 18 and 20, respectively, comprises a single coaxial cable, may comprise a head-end amplifier. A head-end amplifier supplies a carrier signal at its output having a frequency different from the frequency of a carrier signal at its input, wherein the output carrier signal has encoded therein information encoded into the received carrier signal. A head-end amplifier may be employed in systems wherein it is desirable to provide noise immunity by separating the frequency of the transmitted and received carriers such that harmonic influence therebetween is minimized.

Directional coupler 22 has low insertion loss (typically less than 1 db) in the straight through transmission path of bus 18 and a high reverse coupling factor (typically at least 30 db) between the input port thereof connected to the Tx port of BIU 16 and the input port connected to bus 18 from upstream BIUs. A high reverse coupling factor is necessary to prevent the energy detect circuit 56 (FIG. 2) of BIU 16, which is internally connected to the energy detect (ED) port of BIU 16, from responding to transmission from its associated or further downstream BIU's. Forward coupling factor from the input of port directional coupler 22, which is connected to the Tx port of BIU 16, to the output port of directional coupler 22, is typically about 12 db.

The manner in which user terminal information or data is transmitted from user terminals 14 to their respective BIU's 16, and the method for properly formatting data from information packets as the data are transferred to associate user terminals 14 from BIU's 16, are well known in the art and do not form part of the present invention. Accordingly, the specific methods and apparatus for carrying out these transfers will not be described herein. Data as used herein includes digital data, encoded voice and other forms of intelligence which may be transferred between components of the system. An exemplary method for achieving these results may be found in International Standard CCITT X.25. The present invention concerns the bus accessing method under which the information packets, once properly formatted either according to a packet-switching or a circuit-switching mode of operation, are transferred from BIU's 16 to bus 18. Accordingly, it is assumed that information or data is periodically transferred from user terminals 14 to their associated BIU's 16 and is formatted for transmission by BIU 16. It is also assumed that information packets subsequently received by BIU's 16 are reformatted and the data therefrom are transferred to their appropriate associated user terminals 14.

In accordance with the bus accessing scheme of the present invention each BIU is capable of operating in each of three modes or states: free, captive and preemptive. When all BIUs are operating in a free mode, each BIU 16 continually monitors the condition of receive bus 20 and each BIU 16 except BIU 16-1 continually monitors the condition of transmit bus 18. Each BIU 16 having an information packet to transmit and determining that the buses being monitored are silent, immediately begins supplying the respective information packet to be transmitted to transmit bus 18 via transmit port Tx of each respective BIU 16. Assuming that only a single BIU 16 transmits an information packet and that no other BIU's transmit within the captive period equal to 2T, i.e. the time it takes the leading edge of an information packet to propagate along the entire transmit bus 18 and receive bus 20 there will be no conflicts (after the captive period all BIU's will have detected energy from the single transmitting BIU 16 from either transmit or receive bus 18 or 20, respectively and therefore the buses will not be silent). As this packet proceeds along transmit bus 18, it is amplified by amplifier 15, and is retransmitted along receive bus 20. As the packet propagates along receive bus 20, it is sequentially received or copied by each BIU 16 via its respective receive port Rx. Each BIU examines the received packet to determine if it has been properly received (this may be done using a standard CRC check) and if it is addressed to user terminal 14 associated with respective BIU 16. If it is so addressed the data therefrom are transmitted to appropriate user terminal 14. Since the single BIU 16 will recognize the information packet copied from its Rx port as the complete (i.e. no conflict) information packet it previously transmitted, the single BIU 16 determines that it has completed a successful transmission and thus begins to operate in the captive mode. As long as no conflicts occur during information packet transmissions, all BIU's operating in the free mode continue to access the buses and enter the captive mode as hereinabove described.

Each BIU 16 having completed a successful transmission remains in the captive mode until the buses have been determined to be silent for a predetermined interval, i.e. communication period plus captive period, or until a maximum predetermined captive mode interval has expired, at which instant each BIU 16 having completed a successful transmission reverts to operation in the free mode. The end of each information packet received or copied by a BIU 16 is immediately followed by a communication period equal to at least 2T (i.e. total propagation time along both transit and receive buses 18 and 20, respectively) and the communication period is immediately followed by a captive period equal to at least 2T. It is preferable not to extend the communication period or the captive period beyond 2T, respectively, since any extension adds to system overhead without increasing system efficiency. The maximum predetermined captive mode interval is set to be large enough to ensure that any BIU 16 having an information packet to transmit is able to successfully complete transmission before a BIU 16 having had a successful transmission and still operating in the captive mode is able to revert to operation in the free mode.

While each BIU 16 monitors buses 18 and 20 to ensure that there is no energy on these buses before transmitting an information packet, as previously described, it is possible that two or more BIUs will begin transmitting an information packet within an interval equal to 2T due to the propagation delays in transmit and receive buses 18 and 20, respectively. For example, BIU 16-1 may sense bus 18 and BIU's 16-3 and 16-72 may simultaneously sense buses 18 and 20 and all three determine that they are permitted to attempt to transmit an information packet.

For a typical bus which is 4 km long and has BIU's connected along its length, the maximum one-way transmission time is about 20 microseconds. Data are typically transferred along the bus at the rate of 2 megabits per second (Mb/sec) and a typical information packet length is from 100–500 characters (bytes) (1 byte = 8 bits). Thus even if two BIU's which are each respectively situated at an end of the bus attempt to transmit at the same time, the transmission from the upstream one will overtake or conflict with the transmission from the downstream one within 20 microseconds, i.e. no later than after the downstream BIU has supplied only 40 bits (5 bytes) to the bus.

After the information packet being transmitted by BIU 16-3 has been partially transmitted, the leading edge of the information packet generated by BIU 16-1 will have reached the energy detect port ED of BIU 16-3. Similarly, after the information packet being transmitted by BIU 16-72 has been partially transmitted, the beginning of the information packet transmitted by BIU 16-3 will have reached the energy detect port ED of the BIU 16-72. As soon as BIUs 16-3 and 16-72 have detected energy (indicative of information packets) on their respective energy detect ports ED, they immediately abort transmission of their own packets so that only the information packet having been transmitted by BIU 16-1 is allowed to propagate along buses 18 and 20. Aborting transmission of each information packet occurs sufficiently fast such that only a very small portion of the preamble (initial portion of serial transmission) of the information packet transmitted by BIU 16-1 is destroyed. The necessary preamble length is typically 6 bytes and is used for timing and synchronization purposes by each BIU 16 when an information packet is received or copied from its respective receive port Rx from receive bus 20. To ensure that at least 6 bytes of preamble will not be destroyed, in order to enable each BIU 16 to properly receive and process any information packets from its respective receive port, the preamble should be at least long enough to have at least 6 bytes of preamble left undamaged after a conflict between the most upstream and most downstream BIU, i.e. at least 11 bytes long for the example above.

Once the information packet transmitted by BIU 16-1 has been received on receive port Rx of each BIU 16 (as may be indicated by an end of packet character encoded into the information packet), each BIU 16 enters a communication period and BIU 16-1 (i.e. the BIU having completed a successful transmission) enters the captive mode. Since each BIU 16 determines the end of packet at a different instant (due to propagation delays in receive bus 20), the real-time start of the communication period is slightly later for each successive upstream BIU.

During the communication period, no BIU 16 is permitted to transmit an information packet. Rather, each BIU which was involved in a collision (i.e. BIUs 16-3 and 16-72 in the example above) attempts to gain clearance to transmit its aborted information packet by placing a signal on transmit bus 18 which indicates to other BIUs that a BIU is attempting to gain access to the bus. In a presently preferred embodiment, this signal (or beep) takes the form of a short modulated signal, i.e. 4 bits, comprising alternating zeros and ones. Any suitable signal can, however, be used since the energy detect circuit senses energy and not information encoded into the signal. Any BIU 16 receiving a beep on its energy detect port ED determines that an upstream BIU (since transmission bus 18 is unidirectional) is attempting to gain access to bus 18. Only a BIU which transmits a beep and does not receive a beep on it its energy detection port ED (i.e., the most upstream BIU which transmits a beep) is permitted to gain access to bus 18. The most upstream BIU having transmitted a beep is the next BIU permitted to transmit its information packet. In the example above, once the first communication period has ended, BIU 16-3 gains access to bus 18.

Each beep is placed on transmission bus 18, amplified, placed on the receive bus 20 and received at the respective receive port Rx of each BIU 16. Each BIU 16 receives the beep within its respective communication period (since the communication period is at least equal to 2T). Having received the beep on its respective receive port Rx, each BIU recognizes that a BIU 16 has gained access to the bus and will be transmitting an information packet shortly. Accordingly, even BIUs which are upstream of all BIUs which transmitted a beep (these BIUs will not receive a beep on their energy detect port ED because of the unidirectional conductivity of bus 18) are prevented from transmitting an information packet.

Each BIU 16 waits for receipt of the information packet transmitted by the most upstream BIU having transmitted a beep, i.e. BIU 16-3 in the example above. When this packet is completely received (as may be indicated by the encoded end of packet character), each BIU begins a new communication period in which the foregoing process is repeated and BIU 16-3 enters the captive mode. As a result, the next most upstream BIU having previously aborted a transmission (i.e. BIU 16-72 in the example above) gains access to bus 18 and transmits its information packet. This process continues until all BIUs which were involved in a conflict and were preempted by the transmission from an upstream BIU have transmitted their previously aborted information packets and have subsequently entered the captive mode. When the last BIU involved in a conflict has successively transmitted its packet, a final communication period is initiated when that packet is received by each BIU 16. No BIU 16 transmits a beep during the final communication period. When the final communication period expires, the preemptive mode of operation is completed and all BIUs not operating in the captive mode i.e. those operating in the free mode, attempt to transmit an information packet, as hereinbefore described.

While the foregoing process ensures an opportunity for all preempted BIUs to obtain access to the bus, it presents problems when voice or other signals requiring time transparency to a user terminal 14, i.e. no appreciable delay between the end of a packet and the beginning of the next packet each destined for the same user terminal 14, are to be transmitted. To overcome this problem, the present invention preferably employs a priority scheme wherein each packet to be transmitted is assigned either a first or second priority. Packets which need not be time transparent (in most systems, the majority of packets need not be time transparent) are assigned second priority and transmitted in the manner described above. Those packets which require time transparency are assigned first priority. BIUs having first priority packets to transmit treat those packets as if they were preempted, i.e. previously aborted packets, and place a beep on transmit bus 18 during each communication period. As a result, BIUs having first priority packets to transmit gain access to bus 18 as a function of their serial connection position on the bus, even though the packets they have to transmit have not been previously preempted. Thus priority of a packet is established without the need of an identifying priority bit in the information packet.

The foregoing process using predetermined priority information packets may best be understood by way of example. In the above example with no packet priorities, BIUs 16-1, 16-3 and 16-72 attempt to transmit an information packet at substantially the same time. The packet transmitted by BIU 16-1 preempts the packets being transmitted by BIUs 16-3 and 16-72. Thereafter, BIUs 16-3 and 16-72 transmit their respective preempted information packets after respective communication periods have terminated. Assuming BIU 16-39 receives a first priority packet from its associated user terminal 14 after BIU 16-1 has begun transmitting its packet but before BIU 16-3 has begun transmitting its packet, BIU 16-39 does not attempt to immediately transmit its first priority packet since bus 18 is busy. When the information packet transmitted by BIU 16-1 has been received at the receive port Rx of BIU 16-39, BIU 16-39 will respond to the receipt of this packet as if it has previously tried to transmit its own packet and had been preempted. Thus, BIU 16-39 will transmit a beep on its transmit port Tx during the ensuing communication period. Since BIU 16-39 also transmits a beep during this communication period, BIU 16-39 defers its transmission to that of BIU 16-3. Thus, at the end of the first communication period, BIU 16-3 transmits its previously aborted information packet and BIUs 16-39 and 16-72 defer to BIU 16-3.

When the information packet generated by BIU 16-3 is received at receive port Rx of BIUs 16-39 and 16-72, they each transmit a beep on their respective transmit port Tx. BIU 16-39 is the most upstream BIU transmitting a beep and gains access to bus 18. Thus, at the end of the second communication period, BIU 16-39 transmits its information packet. Receipt of the information packet from BIU 16-39 initiates a third communication period during which only BIU 18-72 transmits a beep such that at the end of the third communication period, BIU 16-72 gains access to bus 18 and transmits its previously aborted information packet.

As made clear by the foregoing, any BIU 16 which receives a first priority packet from its respective associated user terminal 14, while the system is operating in a preemptive mode, begins transmitting beeps, thus securing a position in order of its respective serial position along bus 18 to transmit its first priority information packet.

In accordance with the foregoing description, each BIU 16 which either was involved in a conflict, or which has a first priority packet to transmit, sequentially transmits its information packet in order of its serial position along bus 18. Specifically, the most upstream BIU with a packet to transmit is permitted to transmit its packet at any given instant. The procedures previously described are biased toward upstream BIUs since downstream BIUs find it harder to gain access to transmit bus (i.e. upstream transmissions always preempt downstream transmissions.) In order to overcome this inequity, the present invention causes any BIU which has successfully completed transmission of an information packet to enter the captive state wherein the successful BIUs are not permitted to transmit another information packet until the preemptive mode is ended, i.e. as BIUs are operating in the preemptive mode, and buses 18 and 20 are totally silent (i.e. no information packets nor beeps) for an interval at least equal 2T after any communication period. The captive state permits all BIU's which are still operating in the free mode after the preemptive mode is terminated to attempt to complete a transmission.

Having described the general bus accessing method of the present invention, a preferred structure of a bus interface unit 16, insofar as this structure relates to the bus accessing scheme of the present invention, will be described with reference to FIG. 2. Each BIU 16 comprises a microprocessor 24, such as a model Z80 microprocessor manufactured by Zilog, or the like, having a program (illustrated in flow diagrams of FIGS. 5-9), which is stored in a ROM 26 or erasable programmable read only memory (EPROM), such as a model 2732 manufactured by Intel, or the like, and executed at timing intervals determined by a clock signal CL generated by a system clock 28.

In order to control operation of BIU 16 in accordance with the program stored in ROM 26, microprocessor 24 generates command signals XBEEP, RS1 through RS6 and TENBL1 through TENBL3. The function of these signals is described below. These signals are provided by a decoder 30 which may be formed using a pair of 3-to-8 decoders (i.e. 3 bi-state signal inputs and 8 bi-state signal outputs, each output signal representing one of a possible combination of eight ($2^3$) input signals). Whenever microprocessor 24 must generate a command signal, it places an appropriate address (e.g. 3 bits) on data bus 32 (this address identifies the specific one of the command signals to be generated) and generates a chip enable signal (CE) (in a manner well known in the art) which is applied to the chip enable input (CE) of decoder 30, directing decoder 30 to generate the appropriate command signal.

At various steps in the program, microprocessor 24 must determine the occurrence of specific events. Thus, microprocessor 24 must recognize if an information packet has been received by BIU 16 (indicated by the state of an end of packet signal EOP); if energy has been detected on transmit bus 18 (indicated by the state of an energy detect signal EDS1); if energy has been detected on receive bus 20 (indicated by the state of an energy detect signal EDS2); and when an interpacket timer 34 and a maximum wait timer 36 have timed out (indicated by the state of time out signals TO1 and TO2, respectively). The circuits for generating the signals are described below. It is sufficient at this point to note that each signal is generated upon the occurrence of the event which they respectively indicate.

In order for microprocessor 24 to recognize the state of these signals, each of signals EDS1, EDS2, TO1, TO2 and EOP are applied to respective inputs of an OR gate 38 and a buffer 40. The output of OR gate 38 is connected to the interrupt input INTR of microprocessor 24. Whenever one of the signals is generated, OR gate 38 applies an interrupt signal to the interrupt input INTR of microprocessor 24. The main program responds to this interrupt signal by completing whatever program step it is presently executing and then performing an interrupt subroutine (FIG. 5) which causes microprocessor 24 to poll buffer 40 to determine the status of the various input signals thereto. At least one of these signals is enabled (at a binary "1" level in the embodiment being considered) indicating the occurrence of its associated event (e.g., receipt of an entire information packet), whenever OR gate 38 generates the interrupt signal. The interrupt subroutine (FIG. 5) sets a flag indicating the occurrence of an event by placing a binary "1" (or alternately a binary "0", as desired) in a predetermined location in RAM 42. Throughout this description, reference is made to flags which are set by the program. In each case, specific storage locations in RAM 42 correspond, respectively, to the indicated flag. When the program sets a flag, it places a predetermined logic bit (i.e., "0" or "1") in the respective storage location. Whenever the program resets the flag, it places the opposite logic bit in the respective storage location. After a flag is set in RAM 42, the program causes decoder 30 to generate an appropriate reset signal, e.g. RS1–RS5, to reset the signal which initiated the interrupt subroutine. For example, if the interrupt subroutine was initiated by generation of time out signal TO1, the subroutine (FIG. 5) sets a CLOCK 1 flag (indicating that timer 1 has timed out) in RAM 42 and then causes decoder 30 to generate reset signals RS4.

Microprocessor 24 also receives an interrupt signal on its interrupt input NMI when a communication period timer 44 times out. The program responds to this interrupt signal by completing execution of its present program instruction, setting the CP TIMER flag, and returning to the step after the one it was executing when it received the interrupt signal.

As noted above, whenever BIU 16 has received a complete information packet on its receive port Rx (as indicated by end of packet signal EOP from an end of packet circuit 52), the program initiates a communication period during which it transmits a beep on transmission bus 18 if its transmission was preempted or if it has a first priority packet to transmit. BIU 16 monitors the receipt of beeps on both its energy detect port ED and its receive port Rx. When a packet is received on receive port Tx of BIU 16, it is transferred to a temporary buffer section of RAM 42 via a modem 46, a receive packet circuit 48 and a memory controller 50. Transfer of information into RAM 42 is controlled automatically by memory controller 50 and receive packet circuit 48 and does not require supervision by microprocessor 24. The manner in which the packet is transferred from modem 46 to RAM 42 is described in M. E. Ulug copending and commonly assigned application Ser. No. 351,221, entitled BIDIRECTIONAL TOKEN FLOW SYSTEM, filed on Feb. 24, 1982, which is incorporated in its entirety herein by reference, and hence is not described in detail herein. Once the information is in RAM 42, it is discarded if it is not addressed to a user terminal 14 associated with BIU 16 or the data therefrom is subsequently transmitted to user terminal 14 in appropriate packets.

Receive packet circuit 48 comprises a serial-to-parallel data converter (not shown) having an input connected to the data-in output of modem 46 and eight outputs coupled to respective inputs of a variable length buffer (not shown) for storing the parallel data. Eight outputs of the buffer are connected through memory controller 50 to respective inputs of RAM 42. Because RAM 42 is shared among several functions, it might not be available to immediately receive the parallel data from receive packet circuit 48 as it is converted. Therefore, the variable length buffer of receive packet circuit 48 temporarily stores the converted data until RAM 42 is ready to receive it. A broadside arrangement of two four-bit wide 9403 integrated circuits, manufactured by Fairchild, or the like, provides both the serial-to-parallel conversion and variable length buffer on one chip for receive packet circuit 48.

The method of the present invention requires that the program recognize when an entire information packet has been received. To this end, an end of packet circuit 52 monitors the DATA IN output of modem 46.

End-of-packet circuit 52 comprises an end-of-packet detector (not shown), such as a retriggerable one-shot type SN74LS123N, manufactured by Texas Instruments, or the like, having the reset input thereto connected to the data-in output of modem 46. Each transition between a logical 1 and a logical 0 in the detected data stream resets the one-shot to its initial timing value. When data is no longer detected, i.e. at the end of a packet, the one-shot times out and enables the EOP signal which constitutes the output of end-of-packet circuit 52 and is provided to OR gate 38 and buffer 40. The program responds to the generation of end of packet signal EOP by setting an EOP flag and directing decoder 30 to generate reset signal RS3 which resets the end of packet circuit 52.

Once an information packet has been fully received, the program initiates a communication period by causing decoder 30 to generate a timer enable signal TENBL1 to enable communication period timer 44. Timer 44 begins counting clock pulses CL generated by system clock 28. When the number of clock pulses CL corresponding to the communication period interval has been counted, timer 44 generates an output signal which is applied to the interrupt input NMI of microprocessor 24. The program responds to this intterrupt signal by setting a CP TIMER flag which directs decoder 30 to generate reset signal RS6.

As noted above, BIU 16 places a beep on transmission bus 18 during a communication period if it has previously been preempted and has not yet successfully transmitted the aborted information packet or if it has a first priority packet to transmit. In either case, the program responds to end of packet signal EOP by directing decoder 30 to generate beep transmit signal XBEEP which is supplied to beep transmitter 54 (shown in more detail and explained in conjunction with FIG. 4). Beep transmitter 54 can take any desired form. For example, beep transmitter 54 can be a counter which is enabled for two microseconds with the result that modem 46 generates a radio frequency signal consisting of alternating ones and zeros and applies this signal to transmit bus 18.

In addition to transmitting a beep, BIU 16 also detects beeps (or more generally any energy) on its energy detect input ED and its receive input Rx. To this end, energy detect input ED is coupled to an energy detect circuit 56 (shown in more detail and explained in conjunction with FIG. 3). When energy detect circuit 56 detects energy at energy detect port ED, it generates an output signal which is supplied to the set input S of R/S flip-flop 58. This causes the energy detect signal EDS1 available from the Q output of flip-flop 58 to go high. The transition of signal EDS1 to a high state causes the program to enter the interrupt subroutine (FIG. 5) which sets the TRANSMIT BUS ENERGY flag and directs decoder 30 to generate reset signal RS1 which is supplied to the reset input R of flip-flop 58 causing energy detect signal EDS1 to go low. If a single bus is used then energy detect circuit 56 is coupled to the bus through a filter (not shown) or other device which ensures that energy detect circuit 56 only responds to the channel frequency corresponding to transmit bus 18 (FIG. 1).

When energy is received on receive port Rx of BIU 16, a carrier signal is generated at carrier output CAR of modem 46 and is applied to the set input S of flip-flop 60. This causes the energy detect signal EDS2 available at the Q output of flip-flop 60 to go high. The program responds to the transition of the EDS2 signal to a high state by entering the interrupt subroutine (FIG. 5) which set the RECEIVE BUS ENERGY flag and directs decoder 30 to generate reset signal RS2 which is provided to the reset input R of flip-flop 60 causing energy detect signal EDS2 to go low.

User terminal 14 is coupled to RAM 42 through interface circuit 71 and memory controller 50. Interface circuit 71 comprises shift registers (not shown) and buffers (not shown) as is known in the art. Microprocessor 70 which may be of the same type as microprocessor 24) has embedded therein (or in an associated ROM (not shown)) a program which stores data to be transmitted from user terminal 14 in RAM 42 through interface circuit 71 and memory controller 50, forms information packets from these data and stores the formed information packets in RAM 42. Likewise, microprocessor 70 accepts information packets from RAM 42 through memory controller 50 which are addressed to user 14 and formats them for transfer to user terminal 14 through memory controller 50 and interface circuit 71.

As noted above, information packets are periodically transferred from user terminal 14 to RAM 42. User terminal 14 is coupled to RAM 42 through interface circuit 71 and memory controller 50. Interface circuit 71 comprises shift registers (not shown) and buffers (not shown) as is known in the art. Microprocessor 70 (which may be of the same type as is microprocessor 24) has embedded therein (or in an associated ROM (not shown)) a program which stores data to be transmitted from user terminal 14 in RAM 42 through interface circuit 71 and memory controller 50, forms information packets from these data and stores the formed information packets in RAM 42. Likewise, microprocessor 70 accepts information packets from RAM 42 through memory controller 50 which are addressed to user terminal 14 and formats them for transfer to user terminal 14 through memory controller 50 and interface circuit 71. If the packet to be transmitted is a first priority packet, a FIRST PRIORITY PACKET TO TRANSMIT flag is set in RAM 42. When either a first or second priority packet is placed into RAM 42 from an associated user terminal 14, a PACKET TO TRANSMIT flag is set.

When the program determines that BIU 16 has an information packet to transmit and further determines that BIU 16 is permitted access to transmit bus 18 (i.e., determines that buses 18 and 20 are idle), the program directs the packet be transferred from RAM 42 to transmit port Tx of BIU 16 via memory controller 50, transmit packet circuit 62 and modem 46. The manner in which information packets are transferred from RAM 42 to the transmit bus is set forth in copending application Ser. No. 351,821.

Transmit packet circuit 62 comprises a variable length buffer (not shown) having eight inputs connected through memory controller 50 to respective outputs of RAM 42 and eight outputs connected to respective inputs of a parallel-to-serial converter (not shown) of transmit packet circuit 62. The output of the parallel-to-serial converter constitutes the output of transmit packet circuit 62 and is connected to the data-out input of modem 46. The variable length buffer of transmit packet circuit 62 temporarily stores the converted data from RAM 42 until modem 46 is ready to transmit it. A broadside arrangement of two four-bit wide 9403 integrated circuits, manufactured by, Fairchild, or the like, provides both the variable length buffer and the parallel-to-serial conversion on one chip for transmit packet circuit 62.

Once a packet has been transmitted, it propagates along transmit bus 18 and receive bus 20, eventually arriving at receive port Rx of BIU 16 which initiated transmission of the packet. When the entire packet has been received (as indicated by activation of end of packet signal EOP), the program places BIU 16 in the captive mode wherein it is not permitted to retransmit any other packets stored in RAM 42 until both transmit and receive buses 18 and 20, respectively, have been idle for an interval equal to a communication period immediately followed by a captive period, whereupon the captive period is at least equal to the total propagation time of transmit and receive buses 18 and 20 (FIG. 1) (hereinafter the interpacket time) or until a substantially longer predetermined time interval (maximum wait period) (e.g., 16 milliseconds) expires. To this end, after BIU 16 has received its own packet, the program responds to end of packet signal EOP by generating timer enable signals TENBL2 and TENBL3 which enable timer 1 or captive period timer 34 and timer 2 or wait period timer 36, respectively. When interpacket timer 34 times out, it generates time out signal TO1 which is supplied to OR gate 38 and causes OR gate 38 to generate an interrupt signal. The program responds to the interrupt signal by setting the CLOCK 1 flag and directing decoder 30 to generate reset signal RS4 in order to reset captive period timer 34. At the end of the maximum wait period, timer 36 times out and generates time out signal TO2. This signal, which is supplied to OR gate 38, causes OR gate 38 to generate an interrupt signal. The program responds to the interrupt signal by setting the CLOCK 2 flag and directing decoder 30 to generate reset signal RS5 in order to reset wait period timer 36.

Thus three time intervals are considered by each BIU 16. The communication period (CP) follows the end of each packet and is the interval during which all pre-empted BIU's transmit a beep. Another interval is the captive period which is about 40 microseconds for a 4 km bus and the third, maximum wait period, is an arbitrarily long period which is preselected to expire when it is considered any BIU 16 has waited long enough in the captive state before attempting another transmission irrespective of whether the bus has been idle as hereinbefore described. Since the beep is received on left bus 20 by upstream BIU's, the CP must be at least equal to .2T.

Figure 3:
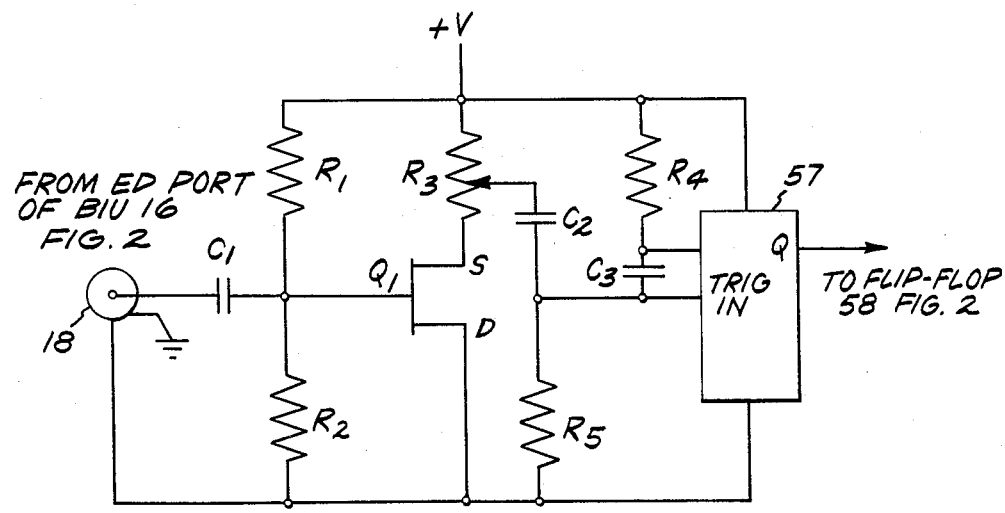
FIG. 3 is a schematic diagram of an energy detect circuit useful with a BIU of the present invention.

Referring to FIG. 3, an energy detect circuit useful with the present invention is shown. The energy carrying portion of bus 18 is connected to the gate of FET Q1 through blocking capacitor C1 and the ground of bus 18 is connected to the drain (D) of FET Q1, to one end of each of biasing resistor R2 and voltage divider resistor R5 and to a retriggerable one-shot 57, such as a type SN74LS123N integrated circuit manufactured by Texas Instruments, or the like. The other end of resistor R2 and one end of biasing resistor R1 are connected to the gate of Q1. The other end of resistor R1 and an end of each of adjustable resistor R3 and timing resistor R4 are supplied with a source of operating voltage +V. The other end of resistor R3 is connected to the source (S) of FET Q1, while the wiper of resistor R3 is connected to the TRIG IN input of one-short 57 through blocking capacitor C2. The other end of resistor R4 and one side of timing capacitor C3 are connected to the timing input of one-short 57.

The FET Q1 amplifies any AC signal (i.e., carrier) appearing on bus 18 and applies a fraction of the amplified signal, which fraction is adjustable by the voltage divider formed by resistors R3 and R5, to the trigger input of one-shot 57, causing the Q output signal thereof, which constitutes the output of energy detect circuit 56 (FIG. 2), to transition from the reset stage to the set state. The Q output signal of one-shot 57 will remain in the set state for an interval after the removal of a signal at the TRIG IN input thereof before transitioning to the reset state. The length of the interval is determined by the RC time constant of timing resistor R4 and capacitor C3.

Figure 4:
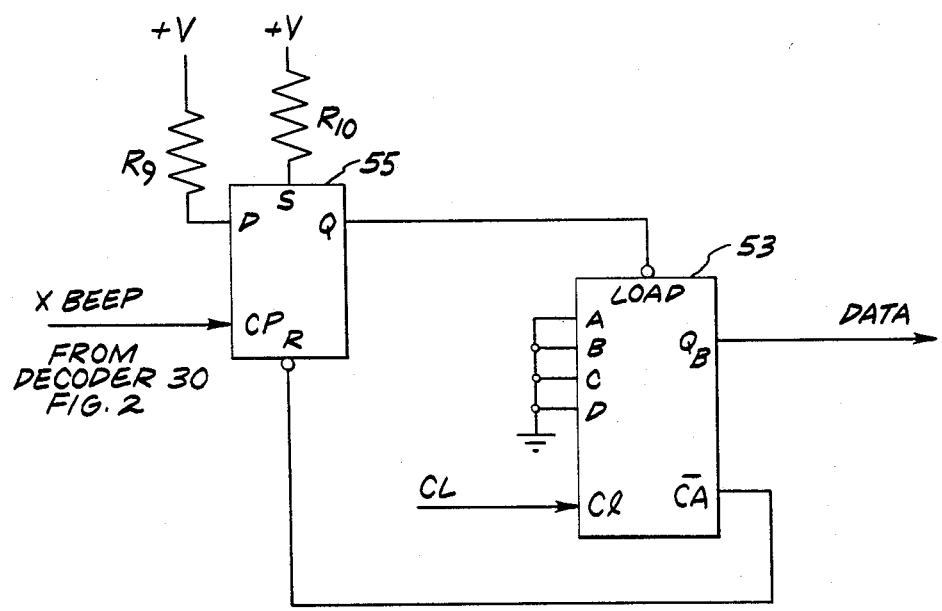
FIG. 4 is a schematic diagram of a beep transmitter useful with a BIU of the present invention.

Referring to FIG. 4, a beep transmitter useful with the present invention is shown. The beep transmitter comprises a flip-flop 55 and a counter 53 which may be a type SN74LS74N and a type SN74LS161N (4 stage), respectively, manufactured by Texas Instruments, or the like. When the XBEEP signal, which is supplied by decoder 30 (FIG. 2) to the clock CP input of flip-flop 55, transitions (indicating BIU 16 (FIG. 1) has a beep to transmit) the Q output signal of flip-flop 55 transitions to a logic 1 state, thereby enabling counter 53. Preset inputs A-D (one for each stage) of counter 53 are connected to ground potential (logic 0 state). When the Q signal from flip-flop 55 assumes a logic 1 state, counter 53 begins to count cycles of the system clock CL signal supplied to the CP input of counter 53. The second stage output $Q_B$ of counter 53 constitutes the output of beep transmitter 54 (FIG. 2). Since the second stage of counter 53 provides the output thereof and initially all stages were preset to a logic 0, the DATA signal available at the $Q_B$ output of counter 53 will alternate states (logic 1 and logic 0) after every two cycles of the system clock signal CL, beginning with a logic 0 state (i.e. logic 0 during cycles 1 and 2; logic 1 during cycles 3 and 4). Thus the DATA signal will appear as 0101 (i.e. 16 cycles of system clock CL). At the end of the 16th cycle of system clock CL, the carry out signal available at the $\overline{CA}$ output of counter 53 and supplied to the reset R input of flip-flop 55 transitions to a logic 0 state, causing the signal available at the Q output of flip-flop 55 to transition to a logic 0 and thereby disabling counter 53. Thus a beep is only 4 bits (½ byte) long. Of course a longer beep is possible, however more overhead would be required thereby reducing overall system efficiency.

Having described the various components of BIU 16 which relate to the bus accessing scheme of the present invention, the operation of BIU 16 will now be described with reference to the flow diagram of FIGS. 5–9. This flow diagram corresponds to the program stored in ROM 26.

As noted above, whenever microprocessor 24 (FIG. 2) receives an interrupt signal on its interrupt input INTR, it executes an interrupt subroutine wherein it polls buffer 40 (FIG. 2) and sets appropriate flags in RAM 42 (FIG. 2) to indicate the occurrence of specified events. The interrupt subroutine which effectuates this process is illustrated in FIG. 5. Whenever microprocessor 24 receives an interrupt signal on its INTR input, it completes the program instruction it is executing and immediately jumps to start interrupt subroutine step 100 to begin sequentially polling the inputs of buffer 40 to determine which input signal is enabled, and thereby which event has occurred. Proceeding to step 102 the program determines if energy detect signal EDS1 is enabled, indicating that energy has been detected on transmit bus 18 (FIG. 1). If it is enabled, step 104 sets the TRANSMIT BUS ENERGY flag in RAM 42 (FIG. 2) and flip-flop 58 (FIG. 2) is reset by performing step 106 which directs decoder 30 (FIG. 2) to generate reset signal RS1.

If energy detect signal EDS1 was not enabled (Step 102) or if step 106 has been performed the program proceeds to step 108 to determine if energy detect signal EDS2 is enabled, indicating that energy has been sensed on receive bus 20. If it is enabled, step 110 sets the RECEIVE BUS ENERGY flag in RAM 42 (FIG. 2) and flip-flop 60 (FIG. 2) is reset by performing step 112 which directs decoder 30 (FIG. 2) to generate reset signal RS2.

Figure 2:
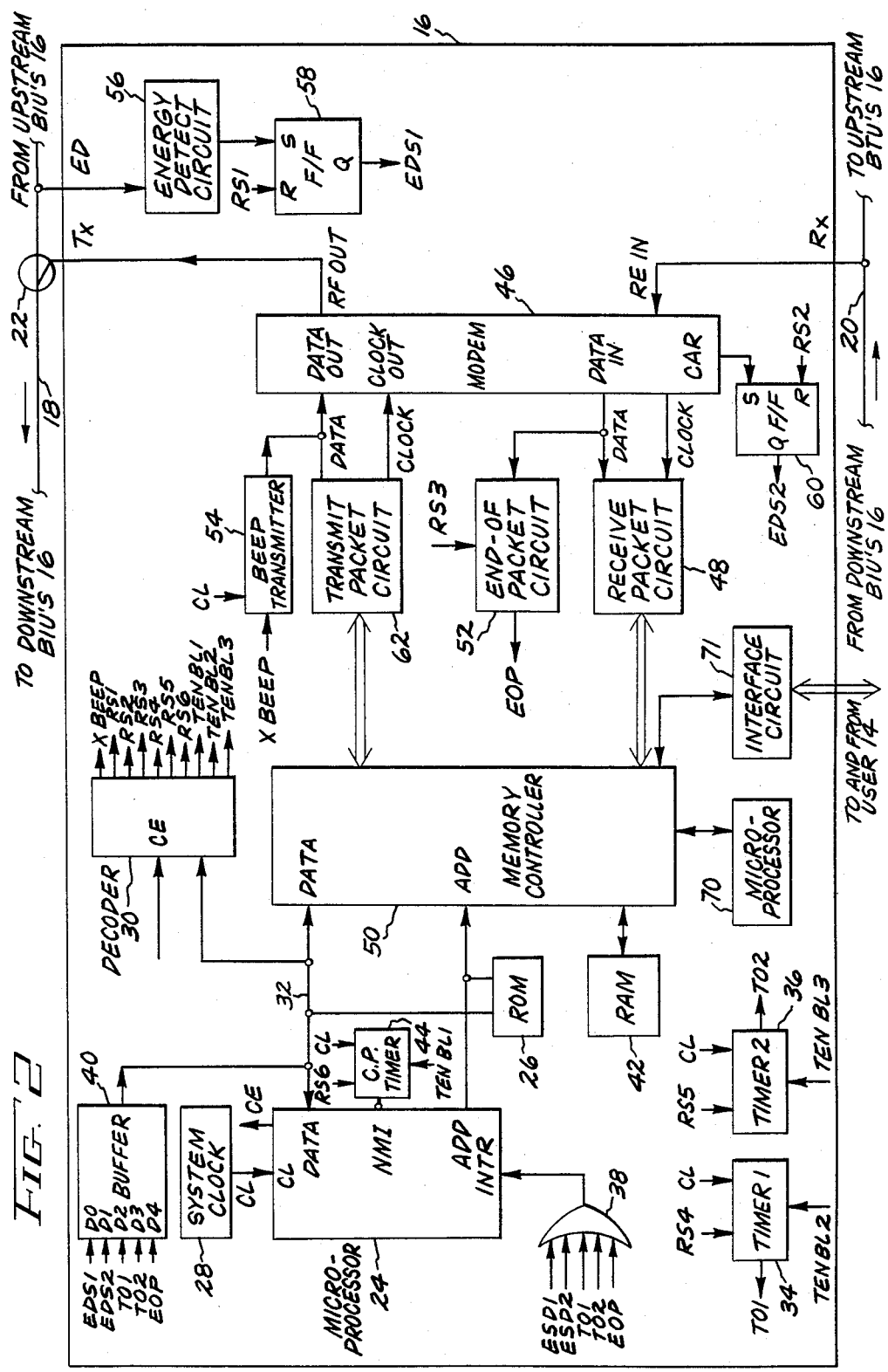
FIG. 2 is a block diagram illustrating the structure of a bus interface unit of FIG. 1.

If energy detect signal EDS2 was not enabled, (step 108) or if step 112 has been performed, the program proceeds to step 114 to determine if end of packet signal EOP is enabled, indicating that an information packet has been fully received by BIU 16 (FIG. 2). If it is enabled, step 116 sets the EOP flag in RAM 42 (FIG. 2) and end of packet circuit 52 (FIG. 2) is reset by performing step 118 which directs decoder 30 (FIG. 2) to generate reset signal RS3.

If end of packet signal EOP was not enabled (step 114) or if step 118 has been performed, the program proceeds to step 120 to determine if time out signal TO1 is enabled, indicating that interpacket timer 34 (FIG. 2) has timed out. If it is enabled, step 122 sets the CLOCK 1 flag in RAM 42 (FIG. 2) and interpacket timer 34 (FIG. 2) is reset by performing step 124 which directs decoder 30 (FIG. 2) to generate reset signal RS4.

If time out signal TO1 was not enabled (step 120) or if step 124 has been performed, the program proceeds to step 126 to determine if time out signal TO2 is enabled, indicating that maximum wait period timer 36 (FIG. 2) has timed out. If it is enabled, step 128 sets the CLOCK 2 flag in RAM 42 (FIG. 2) and maximum wait period timer 36 (FIG. 2) is reset by performing step 130 which directs decoder 30 (FIG. 2) to generate reset signal RS5. The interrupt subroutine is completed and step 132 is performed to return to the step in the main program after the step the main program finished executing before entering the interrupt subroutine.

The main program is illustrated in FIGS. 6 through 9. Referring to FIG. 6, the main program starts by executing step 200 which determines if either TRANSMIT BUS (TB) ENERGY or RECEIVE BUS (RB) ENERGY flag is set. If either or both flags are set, indicating that an information packet or beep (i.e. energy) is sensed on transmit bus 18 or receive bus 20, respectively, the program proceeds to step 202 to reset the TRANSMIT EITHER PRIORITY and TRANSMIT FIRST PRIORITY flags. The TRANSMIT EITHER PRIORITY flag is set whenever BIU 16 (FIG. 2) is permitted to transmit either a first or a second priority packet. The TRANSMIT FIRST PRIORITY flag is set whenever BIU 16 is free to transmit only a first priority packet. If neither flag is set, BIU 16 is not permitted to transmit any information packet.

Proceeding to step 204, the program directs BIU 16 to receive and analyze the packet which was sensed by execution of step 200. The details of the software required to perform this function are set forth in co-pending application Ser. No. 351,821. The program then proceds to execute decision block 206 which it repeats until the EOP flag is set. This flag is set when the entire packet is received by BIU 16 (FIG. 2). The program then proceeds to execute step 208 which resets the EOP, RECEIVE BUS ENERGY and TRANSMIT BUS ENERGY flags. The program performs step 210 directing decoder 30 (FIG. 2) to generate transmit enable signal TENBL1, thereby setting communication period (CP) timer 44 (FIG. 2). The program repeats step 212 until communication period timer 44 times out, as indicated by CP TIMER flag being set. Execution of step 214 resets the CP TIMER flag and execution of step 216 determines if either the TRANSMIT BUS ENERGY or RECEIVE BUS ENERGY flags are set. The TRANSMIT BUS ENERGY flag is set if BIU 16 (FIG. 2) detects energy on its energy detect port ED during the communication period. The RECEIVE BUS ENERGY flag is set if BIU 16 detects energy on its receive port Rx during the communication period.

If neither TRANSMIT BUS ENERGY nor RECEIVE BUS ENERGY flag is set (indicating that no other BIUs are attempting to gain access to bus 18 (FIG. 1)), execution of step 218 sets TRANSMIT EITHER PRIORITY flag. The program then performs step 220 to determine if the PACKET TO TRANSMIT flag is set. If it is set, indicating that there is a packet in RAM 42 (FIG. 2) to transmit, the program proceeds to execute step 238 of the transmit subroutine illustrated in FIG. 7. If the PACKET TO TRANSMIT flag is not set, the program repeats step 200.

If either TRANSMIT BUS ENERGY or RECEIVE BUS ENERGY flag is set when step 216 is performed, the program executes step 222 to determine if the TRANSMIT BUS ENERGY flag is set. If it is not set, indicating that energy was detected on receive bus 20 (FIG. 1) and that BIU 16 (FIG. 2) is free to transmit a first priority packet, the program executes step 224 which resets the RECEIVE BUS ENERGY flag and then performs step 226 to set the TRANSMIT FIRST PRIORITY flag. The program proceeds to execute step 228 which determines if the FIRST PRIORITY PACKET TO TRANSMIT flag is set. If it is set, RAM 42 (FIG. 2) has stored therein a packet to transmit and the program transmits the packet in accordance with the subroutine illustrated in FIG. 7. If the FIRST PRIORITY PACKET TO TRANSMIT flag is not set, the program repeats step 200.

Referring to step 222, if the TRANSMIT BUS ENERGY flag is set, indicating that a beep was received from an upstream BIU 16 during the communication period, (FIG. 1) and downstream BIU 16 is therefore not free to transmit any information packet, the program executes step 230 to reset both the TRANSMIT BUS ENERGY and RECEIVE BUS ENERGY flags and then repeats step 200.

The program thus repeats step 200 only after the communication period has been completed and after the TRANSMIT BUS ENERGY and RECEIVE BUS ENERGY flags, which were previously set upon receipt of a beep, have been reset. Accordingly, when the program repeats step 200, the TRANSMIT BUS ENERGY and RECEIVE BUS ENERGY flags are only set if an information packet (rather than a beep) is detected on transmit bus 18 or receive bus 20 (FIG. 1). Assuming that neither of these flags is set (and that there is presently no activity on the buses), the program proceeds to step 232 to determine if the TRANSMIT EITHER PRIORITY flag is set. If it is set, the program proceeds to step 220 to determine if the PACKET TO TRANSMIT flag is set. If it is set, the program transmits the packet in accordance with the subroutine illustrated in FIG. 7. If the PACKET TO TRANSMIT flag is not set, the program repeats step 200. Assuming that transmit and receive buses 18 and 20, respectively, are both idle and that the BIU 16 does not have a packet to transmit, the program loops through steps 200, 232 and 220 until another BIU 16 (FIG. 1) transmits an information packet or until an information packet to be transmitted is transferred into RAM 42 (FIG. 2) from a user terminal 14 (FIG. 1) associated with BIU 16 (FIG. 1).

Referring to step 232, if the TRANSMIT EITHER PRIORITY flag is not set, the program proceeds to execute step 234 to determine if the TRANSMIT FIRST PRIORITY flag is set. If it is set, the program proceeds to step 228 to determine if the FIRST PRIORITY PACKET TO TRANSMIT flag is set. If it is set, the first priority packet is transmitted in accordance with the subroutine illustrated in FIG. 7. If the FIRST PRIORITY PACKET TO TRANSMIT flag is not set, the program repeats step 200.

If the TRANSMIT FIRST PRIORITY flag is not set when step 234 is performed, the program executes step 236 to determine if the FIRST PRIORITY PACKET TO TRANSMIT flag is set. If it is not set, the program repeats step 200. If it is set, the program proceeds to the preemptive state subroutine illustrated in FIG. 8. This subroutine is described in detail below. It is sufficient to note at this time that this subroutine treats the first priority packet as if it had been a preempted packet and transmits the packet as soon as BIU 16 (FIG. 1) gains access to transmit bus 18 (FIG. 1).

Figure 7:
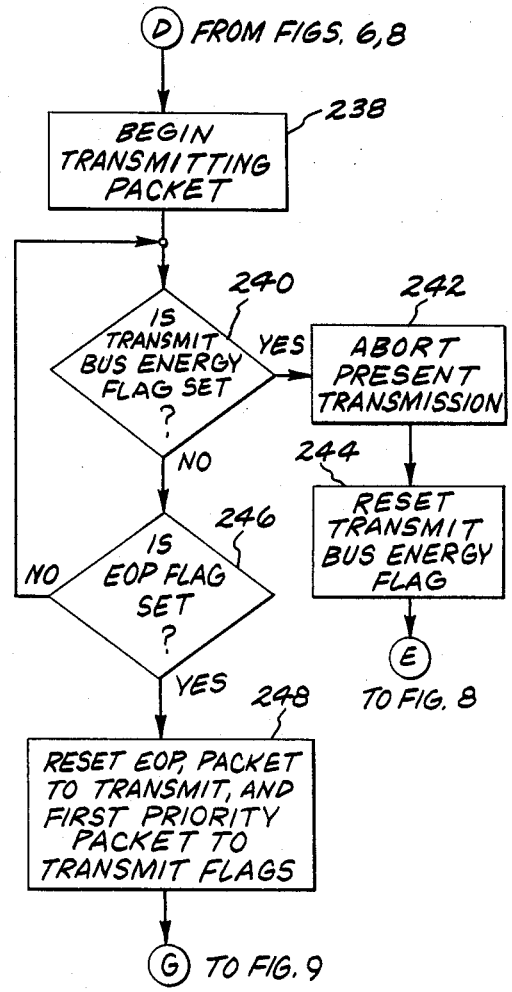

Referring to FIG. 7, the transmit packet subroutine will be described. Execution of step 238 directs BIU 16 (FIG. 2) to begin transmitting the packet stored in RAM 42 (FIG. 2). The specific steps which are required to transmit the packet are reviewed in detail in copending application Ser. No. 351,821 and will not be described herein. It is sufficient to note that once the program initiates the transmission process, it is automatically carried out by the interaction between memory controller 50 (FIG. 2) and transmit packet circuit 62 (FIG. 2) such that no further program steps are necessary to ensure transmission of the packet. The program then performs step 240 to determine if the TRANSMIT BUS ENERGY flag is set. If it is set, indicating that an information packet is being transmitted by an upstream BIU 16 (FIG. 1) and that downstream BIU 16 (FIG. 1) must defer to the information packet from the upstream BIU, the program performs step 242 to abort the present transmission (this may be accomplished by supplying an appropriate short signal to transmit packet circuit 64 (FIG. 2) which aborts transmission in response to the short signal. Step 244 is then performed to reset the TRANSMIT BUS ENERGY flag. At this point, the BIU 16, having had a transmission aborted, operates in the preemptive mode in accordance with the subroutine illustrated in FIG. 8.

Referring to step 240, if the TRANSMIT BUS ENERGY flag is not set, the program performs step 246 to determine if the END OF PACKET flag (EOP) is set. If it is not set, indicating that BIU 16 (FIG. 2) has not received a completed transmission of its own information packet on receive bus 20, step 240 is repeated to again determine if the TRANSMIT BUS ENERGY flag is set. The program loops through steps 240 and 246 until either an upstream packet is received on the energy detect port ED of the BIU (in response to which the TRANSMIT BUS ENERGY flag is set and the program proceeds to step 242) or until the EOP flag is set, which directs the program to execute step 248 to reset the EOP, PACKET TO TRANSMIT and FIRST PRIORITY PACK TO TRANSMIT flags. Since the BIU will now have successfully completed transmission of a packet while operating in the free mode, it enters the captive mode. To this end, the program proceeds to the captive state subroutine illustrated in FIG. 9 which is described below.

Figure 8:
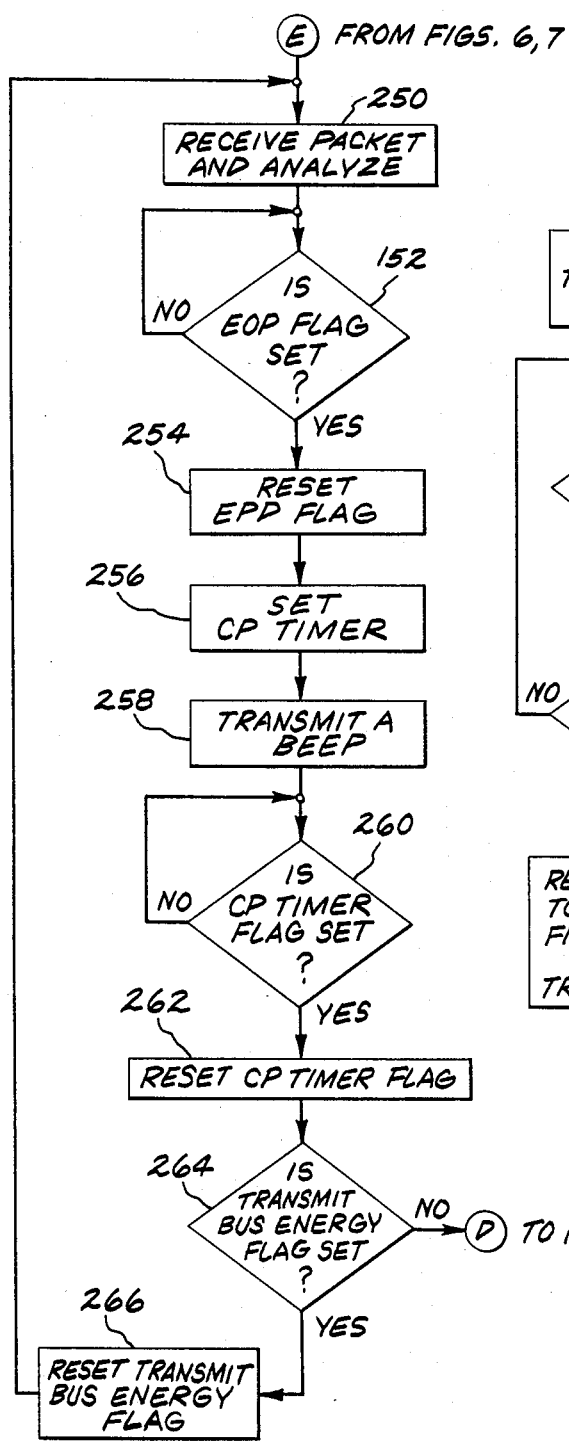

The preemptive state subroutine illustrated in FIG. 8 will now be described. The program enters this subroutine either when transmission of a packet has been aborted (from FIG. 7, step 244) or when the FIRST PRIORITY PACKET TO TRANSMIT flag is set (from FIG. 6, step 236).

The preemptive subroutine begins with the execution of step 250 which receives and analyzes the preempting packet. As noted above, the specific steps for performing this function are set forth in detail in co-pending application Ser. No. 351,821. It is sufficient to note that once this process is started, it is automatically carried out by receive packet circuit 48 (FIG. 2) and memory controller 50 (FIG. 2) without the need of further program steps.

Proceeding to step 252, the program monitors the EOP flag to determine if it is set. Step 252 is repeated until the EOP flag is set, indicating the packet is fully received. When the packet is fully received, step 254 is performed to reset the EOP flag and execution of step 256 sets the CP timer 44 (FIG. 2). CP timer 44 is set by directing decoder 30 (FIG. 2) to generate timer enable signal TENBL1.

Execution of step 258 causes BIU 16 (FIG. 2) to transmit a beep by directing decoder 30 (FIG. 2) to generate transmit beep signal XBEEP which is supplied to beep transmitter 54 (FIG. 2). The program then repeats step 260 until the CP TIMER flag is set. The CP TIMER flag is set when the communication period is over, i.e. CP timer 44 (FIG. 2) runs out. The program proceeds to perform step 262 which resets the CP TIMER flag and execution of step 264 determines if the TRANSMIT BUS ENERGY flag is set. If it is set, indicating that a beep has been received from an upstream BIU and that downstream BIU 16 (FIG. 1) must defer to upstream BIU 16, step 266 is executed to reset the TRANSMIT BUS ENERGY flag. The program then repeats step 250. If the TRANSMIT ENERGY BUS flag is not set when step 264 is performed, BIU 16 is permitted to transmit its information packet and the program proceeds to step 238 of the transmit packet subroutine of FIG. 7.

Once BIU 16 has successfully (i.e., without aborting transmission) transmitted its packet, it begins the captive state subroutine illustrated in FIG. 9. Execution of step 268 sets the captive period and maximum wait period timers 34 and 36 (FIG. 2), respectively, by directing decoder 30 (FIG. 2) to generate timer enable signals TENBL2 and TENBL3, respectively. Maximum wait period timer 36 is set for a substantially longer interval than captive period timer 34.

The program repeats step 270 until the CLOCK 1 flag is set. This flag is set when captive period timer 34 times out (i.e., at the end of the captive period). When the CLOCK 1 flag and step 272 is executed to reset the CLOCK 1 flag and step 274 determines if either the TRANSMIT BUS ENERGY or RECEIVE BUS ENERGY flag is set. If neither flag is set, indicating BIU 16 (FIG. 2) has not received any beeps or packets during the captive period, BIU 16 (FIG. 2) reverts from the captive to the free mode and is then able to attempt to transmit another information packet by repeating step 200 (FIG. 6). If either the TRANSMIT BUS ENERGY or RECEIVE BUS ENERGY flag is set when step 274 is performed, BIU 16 (FIG. 2) must remain in the captive state. The program proceeds to step 276 to reset the RECEIVE BUS ENERGY and TRANSMIT BUS ENERGY flags. The program then repeats step 278 until the EOP flag is set indicating an information packet sensed on receive bus 20 has been completely received. When this packet has been completely received, the EOP flag is set and execution of step 280 resets the EOP flag. Performing step 282 determines if the CLOCK 2 flag is set. The CLOCK 2 flag is set when maximum wait period timer 36 (FIG. 2) times out. If the clock 2 flag is not set when step 282 is performed, the program executes step 284 to reset the CLOCK 1 flag and step 286 to set the captive period timer 34 (FIG. 2) as hereinbefore described and then repeats step 270. As long as the TRANSMIT BUS ENERGY or RECEIVE BUS ENERGY flags are set when step 274 is performed, the program continues to loop through steps 270–286 until the maximum wait period timer 36 (FIG. 2) times out at which time the CLOCK 2 flag is set and execution of step 282 directs the program to repeat step 200 (FIG. 6). BIU 16 is able to attempt to transmit information packets in accordance with the procedure hereinbefore described.

In accordance with the foregoing method, a communication period is established each time BIU 16 receives an information packet on receive bus 20. A typical information packet takes 400 microseconds to transmit (0.5 μsec/bit 100 bytes). A typical communication period is 40 microseconds (for a 4 km transmit and 4 km receive bus). As a result, at least 10% of the possible bus communication time is wasted as a result of the communication periods. This drawback can be overcome by modifying the foregoing procedure so as to generate a communication period only if the information packet received by BIU 16 has a damaged preamble, indicating that the information packet was involved in a conflict. The communication period is only necessary when such a conflict has occurred.

This feature of the invention can be incorporated into the embodiment described above by providing a conflict detect circuit which examines the signal received by BIU 16 to determine if the preamble has been damaged. One possible way of achieving this result is to provide an amplitude detector circuit (not shown) connected to the receive port Rx of BIU 16 and monitoring the level of energy of the received signal. When there is a conflict, the energy level of the portion of the preamble involved in the conflict will approximately double. The amplitude detector would detect this increase in energy level and generate a signal indicating that a conflict had taken place. BIU 16 would enter the communication period only if a signal indicating that a conflict took place is generated. In such a modification, an additional step would be added after step 208 (FIG. 4). This step would determine if the packet which has just been received was involved in a conflict. If it was, the program would set the TRANSMIT EITHER PRIORITY flag and would proceed to step 220.

Alternatively, a MANCHESTER code could be used to identify data bits within an information packet. A Manchester code requires that there be a transition of the voltage level of the data signal during a predetermined interval. That is, a logic 1 is indicated by a transition from a first voltage level to a second voltage level and a logic 0 is indicated by a transition from the second voltage level to the first voltage level during a respective predetermined interval. Typically, the data signal is synchronized to a periodic clock signal and the predetermined interval is selected to be one-half the period of the periodic clock signal.

After a conflict there will be a violation of the data signal transition requirement of the Manchester code, i.e. there will be at least one predetermined interval during which no data signal transition will occur. This violation, indicative of a conflict, may be detected by circuitry (not shown), connected to the receive port Rx of BIU 16 and monitoring the coding of the receive signal, which circuitry is known in the art. BIU 16 would enter the communication period only if a violation of the Manchester code had occurred and proceed as described above with respect to the amplitude detector.

As noted above, each BIU 16 (FIG. 1) periodically obtains information to be transmitted from one or more associated user terminals 14 (FIG. 1). This information is formatted into information packets of suitable size and format. At any given instant, BIU 16 may have several information packets to transmit. These packets are arranged in a queue (of RAM 42 (FIG. 2)) determined by the order in which they are received (from user terminal 14) and their priority (all first priority before all second priority). Only a packet at the beginning of the queue is transmitted during a transmit operation. This packet is referred to in the following claims as the user information packet to be transmitted.

Thus has been shown and described a bus accessing system and method wherein fast access to the bus is provided under light bus utilization and wherein conflicts between information packets do not destroy the packet originating from the most upstream BIU thereby permitting heavy bus utilization. Further, priority for important information is provided and the time necessary to decode a token as used in a token passing scheme is eliminated.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:
1. A bus communication system comprising:
   (a) a unidirectional transmit bus and a receive bus coupled to one another such that information packets leaving said transmit bus are placed on said receive bus;
   (b) a plurality of interface units (BIUs) coupled to each of said transmit and receive buses at spaced locations along said buses; said BIUs communicating with one another by transmitting information packets on said transmit bus and receiving transmitted information packets from said receive bus;
   (c) each of said BIUs periodically obtaining a user information packet to be transmitted and each respective BIU operating;
   (1) in a free mode wherein transmission of said user information packet is initiated substantially immediately when said each respective BIU determines both of said buses are idle, but aborted if said each respective BIU concurrently detects energy on said transmit bus from an upstream BIU;
   (2) in a preemptive mode, after having aborted transmission of said user information packet, by initiating a respective communication period each time a complete information packet is received from said receive bus, transmitting energy on said transmit bus during each said respective communication period, and retransmitting the aborted packet after termination of a respective communication period during which energy is not received on said transmit bus from an upstream BIU, each said respective BIU operating in said preemptive mode from the instant transmission of said user information packet is aborted until retransmission of said aborted information packet is successfully completed, said communication period equal to at least the maximum signal propagation time along both said buses; and
   (3) in a captive mode, during which transmission of a user information packet from said each respective BIU is precluded, extending from the instant said each respective BIU has successfully transmitted a user information packet until both buses have been inactive for a communication period following the receipt of a complete information packet by said each respective BIU and for a captive period immediately thereafter, said captive period equal to at least the maximum signal propagation time along both said buses.

2. The system of claim 1, wherein said communication period and said captive period are each respectively equal to the maximum signal propagation time along both said buses.

3. The system of claim 1, wherein said each respective BIU switches from said captive mode to said free mode after a predetermined interval which is greater than said captive period even if said buses have not been inactive first for said communication period and then for said captive period.

4. The system of claim 1, wherein said each respective BIU is determined to have successfully completed transmission of its user packet when it has received from said receive bus the entire user packet it has transmitted.

5. The system of claim 1, wherein each of said user information packets is assigned either a first or a second priority, and wherein said each respective BIU operates in said preemptive mode and transmits its user information packet immediately after termination of a communication period during which it does not receive energy on said transmit bus from an upstream BIU whenever its user information packet to be transmitted is a first priority packet even if transmission of said first priority packet has not previously been aborted.

6. The system of claim 1, wherein transmission of a user information packet from said respective BIU operating in a free mode is precluded, from the instant said each respective BIU aborts transmission until termination of a respective communication period during which energy is not received, said each respective BIU operating in a free mode initiating said respective communication period each time a complete information packet is received from said receive bus.

7. A bus communication system, comprising:
   (a) a unidirectional transmit bus and a receive bus coupled to one another such that information packets leaving said transmit bus are placed on said receive bus;
   (b) a plurality of bus interface units (BIUs) coupled to each of said transmit and receive buses at spaced locations along said buses; said BIUs communicating with one another by transmitting information packets on said transmit bus and receiving transmitted information packets from said receive bus;
   (c) each of said BIUs periodically obtaining a user information packet to be transmitted, said user information packet having either a first or a second priority, each respective BIU operating:
   (1) in a free mode wherein transmission of said user information packet is initiated substantially immediately when said each respective BIU determines both of said buses are idle, but aborted if said each respective BIU concurrently detects energy on said transmit bus from an upstream BIU;
   (2) in a preemptive mode, after having aborted transmission of said user information packet, by initiating a respective communication period each time a complete information packet is received from said receive bus, transmitting energy on said transmit bus during said respective communication period and retransmitting the aborted information packet after termination of a respective communication period during which energy is not received on said transmit bus from an upstream BIU, said each respective BIU operating in said preemptive mode both from the instant transmission of said user information packet is aborted and when said user information packet is a first priority packet, said each respective BIU continuing to operate in said preemptive mode until it has successfully completed transmission of its user information packet, said communication period equal to at least the maximum signal propagation time along both said buses; and
   (3) in a captive mode, during which transmission of a user information packet from said each respective BIU is precluded, extending from the instant said each respective BIU has successfully transmitted a user information packet until both buses have been inactive for a communication period following receipt of said information packet completely by said each respective BIU and for a captive period immediately thereafter, said captive period being at least as long as the time it takes for a signal to propagate along both buses.

8. The system of claim 7, wherein said communication period and said captive period are each respectively equal to the maximum signal propagation time along both said buses.

9. The system of claim 7, wherein said each respective BIU switches from said captive mode to said free mode after a predetermined period of time greater than said captive period even if said buses have not been inactive first for said communication period and then for said captive period.

10. The system of claim 7, wherein each respective BIU is determined to have successfully completed transmission of its user packet when it has received from said receive bus the entire user packet it has transmitted.

11. The system of claim 7, wherein transmission of a user information packet from said each respective BIU operating in a free mode is precluded, from the instant said each respective BIU aborts transmission until termination of a respective communication period during which energy is not received, said each respective BIU operating in a free mode initiating said respective communication period each time a complete information packet is received from said receive bus.

12. A bus communication system, comprising:
   (a) a unidirectional transmit bus and a receive bus coupled to one another such that information packets leaving said transmit bus are placed on said receive bus;
   (b) a plurality of bus interface units (BIUs) coupled to said transmit and receive buses at space locations along said buses, said BIUs communicating with one another by transmitting information packets on said transmit bus in receiving transmitted information packets from said receive bus;
   (c) each of said BIUs periodically obtaining a user information packet to be transmitted and each respective BIU operating:
   (1) in a free mode wherein transmission of said user information packet is initiated substantially immediately when either (a) both said buses are idle and the last information packet received by said each respective BIU was not involved in a conflict between two information packets or (b) both said buses have been inactive for a communication period immediately followed by a captive period wherein both periods are equal to at least the maximum signal propagation time along both said buses, and wherein the last information packet received by said each respective BIU was involved with a conflict with another information packet, said free mode being further characterized by the abortion of said information packet if said each respective BIU concurrently detects energy on said transmit bus from an upstream BIU;
   (2) in a preemptive mode, after having aborted transmission of said user information packet, by initiating a respective communication period each time a complete information packet is received from said received bus, transmitting energy on said transmit bus during each said respective communication period, and retransmitting the aborted packet after termination of a respective communication period during which energy is not received on said transmit bus from an upstream BIU, said each respective BIU operating in said preemptive mode from the instant transmission of said user information packet is aborted until retransmission of said aborted information packet is successfully completed, said communication period equal to at least the maximum signal propagation time along both said buses; and (3) in a captive mode, during which transmission of a user information packet from said each respective BIU is precluded, extending from the instant said each respective BIU has successfully transmitted a user information packet until both buses have been inactive for a communication period following receipt of an information packet completely by said each respective BIU and for a captive period immediately thereafter, said captive period being at least as long as the time it takes for a signal to propagate along both buses.

13. The system of claim 12 wherein said communication period and said captive period are each respectively equal to the maximum signal propagation time along both said buses.

14. The system of claim 12, wherein said each respective BIU switches from said captive mode to said free mode after a predetermined period of time greater than said captive period even if said buses have not been inactive first for said communication period and then for said captive period.

15. The system of claim 12, wherein said each respective BIU is determined to have successfully completed transmission of its user packet when it has received from said receive bus the entire user packet it has transmitted.

16. The system of claim 12, wherein each of said user information packets is assigned either a first or a second priority, and wherein said each respective BIU operates in said preemptive mode and transmits its user information packet immediately after termination of a communication period during which it does not receive energy on said transmit bus from an upstream BIU whenever its user information packet to be transmitted is a first priority packet even if transmission of said first priority packet has not previously been aborted.

17. The system of claim 12, wherein transmission of a user information packet from said each respective BIU operating in a free mode is precluded, from the instant said respective BIU aborts transmission until termination of a respective communication period during which energy is not received, said each respective BIU operating in a free mode initiating said respective communication period each time a complete information packet is received from said receive bus.

18. A bus interface unit (BIU) for data communication systems wherein information packets are periodically placed on and removed from a bus, comprising:
(a) control means;
(b) energy detect means coupled to said control means for detecting energy on said bus and for signalling said control means when energy is detected on said bus;
(c) first timer means coupled to said control means for providing a time interval corresponding to a captive period;
(d) second timer means coupled to said control means for providing a time interval corresponding to a communication period;
(e) transmitter means coupled to said control means for generating energy during said communication period, wherein said energy is to be placed on said bus during said communication period, and wherein the amount of energy generated is at least that necessary for detection by another BIU but is substantially less than that necessary to transmit an information packet; and (f) memory means coupled to said control means for storing information packets removed from said bus and for storing information packets to be placed on said bus.

19. A BIU as in claim 18 further comprising third timing means coupled to said control means for providing a wait-time period wherein said wait time period is substantially greater than said communication period.

20. A BIU as in claim 18 further comprising detection means having an input adapted to be coupled to said bus and an output coupled to said second timer means for initiating the start of said communication period.

21. A BIU as in claim 18 wherein said transmitter means comprises counter means having an output coupled to said bus for counting a predetermined number of cycles of a system clock signal and providing an output signal representative of the number of cycles counted.

22. A BIU as in claim 21 wherein the number of cycles of the system clock adapated to be counted is substantially less than the length of an information packet.

23. A BIU as in claim 18 wherein said energy detect means comprises:
(a) amplifying means having an input adapted to be coupled to said bus and an output, for amplifying energy detected on said bus; and
(b) triggering means having an input coupled to the output of said amplifying means and an output coupled to said control means, for indicating the presence of energy on said bus.

24. A BIU as in claim 18 wherein said control means comprises a microprocessor.

25. A method for transmitting information packets among a plurality of bus interface units (BIU's) spaced along and coupled to a unidirectional transmit bus and a unidirectional receive bus wherein each BIU comprises an output coupled to said transmit bus and an input coupled to said receive bus, each of said BIU's including memory means for storing an information packet to be transmitted and energy detect means coupled to said transmit bus for sensing energy placed on said transmit bus by an upstream BIU, said transmit bus being coupled to said receive bus such that energy from said transmit bus is supplied to said receive bus, said method comprising the steps of:
(a) sensing energy on said transmit and said receive bus;
(b) operating in a free mode, wherein said information packet is transmitted substantially immediately, by supplying to said transmit bus said information packet to be transmitted when no energy is detected on either said transmit or said receive bus;
(c) aborting supplying of said information packet to be transmitted on said transmit bus when energy is detected on said transmit bus during said supplying, and operating thereafter in a preemptive mode wherein said transmit bus is monitored until said information packet is successfully transmitted; and
(d) operating in a captive mode, during which the transmission of a user information packet from said BIU is precluded, when said information packet supplied to said transmit bus is detected by the supplying BIU without destruction on said receive bus.

26. The method of claim 25 further comprising:
(a) initiating a communication period immediately after receipt of any information packet from said receive bus; and (b) transmitting an energy packet on said transmit bus during said communication period whenever said supplying of said information packet was previously aborted and said supplying BIU is operating in other than said captive mode.

27. The method of claim 26 further comprising supplying said previously aborted information packet to be transmitted on said transmit bus when no energy is detected on said transmit bus during said communication period.

28. The method of claim 26 wherein said communication period is at least equal to the time for the leading edge of a signal to propagate along the entire length of both said transmit and said receive buses.

29. The method of claim 26 wherein said energy packet is substantially shorter in duration than any information packet.

30. The method of claim 29 wherein said energy packet is one-half byte long.

31. The method of claim 25 further comprising reverting from said captive mode to said free mode after a predetermined interval.

32. The method of claim 31 wherein said predetermined interval is greater than the time for the leading edge of a signal to propagate along the entire length of both said transmit and said receive buses.

33. The method of claim 26 further comprising reverting from said captive mode to said free mode when no energy is detected on both said transmit bus and said receive bus during said communication period and during a captive period immediately following said communication period.

34. The method of claim 33 wherein said captive period is at least equal to the time for the leading edge of a signal to propagate along the entire length of both said transmit and said receive buses.

35. The method of claim 26 further comprising:
(a) assigning a first priority to said information packet to be transmitted; and
(b) transmitting an energy packet on said transmit bus during said communication period even when transmission of said information packet having a first priority assigned thereto has not previously been aborted.

36. The method of claim 26 further comprising reverting from said captive mode to said free mode after a predetermined interval.

37. The method of claim 36 wherein said predetermined interval is substantially greater than the time for the leading edge of a signal to propagate along the entire length of both said transmit and said receive buses.

38. The method of claim 25 further comprising:
(a) initiating a communication period immediately after receipt of any information packet from said receive bus;
(b) initiating a captive period immediately following said communication period; and
(c) reverting from said captive mode to said free mode when no energy is detected on both said transmit bus and said receive bus during both said communication period and said captive period.

39. The method of claim 38, wherein said communication period is equal to zero when said any information packet was not involved in a conflict.

40. The method of claim 38, wherein said communication period and said captive period are each respectively equal to at least the maximum signal propagation time along both said buses.

41. The method of claim 38, wherein said communication period and said captive period are each respectively equal to the maximum signal propagation time along both said buses.

* * * * *